United States Patent
Blass et al.

(10) Patent No.: US 9,886,505 B2
(45) Date of Patent: Feb. 6, 2018

(54) INTERACTING WITH PHONE NUMBERS AND OTHER CONTACT INFORMATION CONTAINED IN BROWSER CONTENT

(75) Inventors: Oscar J. Blass, Boynton Beach, FL (US); Men T. Lien, Essex Junction, VT (US); Rodrigo Jose Pastrana, Delray Beach, FL (US); Roberto Vila, Hollywood, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1643 days.

(21) Appl. No.: 11/747,543

(22) Filed: May 11, 2007

(65) Prior Publication Data
US 2008/0282164 A1    Nov. 13, 2008

(51) Int. Cl.
*G06F 17/30*    (2006.01)
*H04M 1/2745*    (2006.01)
*H04M 1/725*    (2006.01)

(52) U.S. Cl.
CPC .. *G06F 17/30861* (2013.01); *H04M 1/27455* (2013.01); *H04M 1/72552* (2013.01); *H04M 1/72561* (2013.01)

(58) Field of Classification Search
USPC ..... 455/553.1; 715/204, 205, 207, 760, 764, 715/810, 825, 864
See application file for complete search history.

(56) References Cited

U.S. PATENT DOCUMENTS

| | | | | |
|---|---|---|---|---|
| 5,805,636 A | * | 9/1998 | Rao et al. | 375/222 |
| 5,859,636 A | * | 1/1999 | Pandit | 715/204 |
| 2002/0065820 A1 | * | 5/2002 | Enns | 707/6 |
| 2004/0085369 A1 | * | 5/2004 | Mak | 345/864 |
| 2006/0010379 A1 | * | 1/2006 | Kashi | 715/531 |
| 2008/0055162 A1 | * | 3/2008 | Qi et al. | 343/702 |
| 2008/0086700 A1 | * | 4/2008 | Rodriguez et al. | 715/804 |
| 2008/0146268 A1 | * | 6/2008 | Gandhi et al. | 455/552.1 |
| 2008/0153503 A1 | * | 6/2008 | Birla et al. | 455/450 |
| 2009/0063869 A1 | * | 3/2009 | Kohavi et al. | 713/189 |

FOREIGN PATENT DOCUMENTS

| | | |
|---|---|---|
| TW | 200607369 A | 2/2006 |
| TW | 200703131 A | 1/2007 |
| TW | 1273489 B | 2/2007 |

\* cited by examiner

*Primary Examiner* — David Choi
(74) *Attorney, Agent, or Firm* — Cuenot, Forsythe & Kim, LLC

(57) ABSTRACT

The present invention discloses a method for handling contact information in a communication device. The method can include a step of presenting content within a visual interface of the communication device. A contact detection algorithm can execute to detect contact items included in the content. A visual indication can be presented next to each detected contact item. User input can be received, which causes the communication device to perform a contact action relating to one of the contact items. The contact action can add contact information to an address book, can initiate a communication session, and/or can place the contact item in a memory space for later use by an application other than one in which the content was presented.

6 Claims, 3 Drawing Sheets

INTERACTING WITH PHONE NUMBERS AND OTHER CONTACT INFORMATION CONTAINED IN BROWSER CONTENT

BACKGROUND

Field of the Invention

The present invention relates to contact information handling by user interfaces and, more particularly, to interacting with phone numbers and other contact content contained in browser content.

Description of the Related Art

Modern mobile communication devices often have multiple user interfaces which exchange information over different communication channels. For example, many mobile phones are equipped with a Web browser, a voice telephony interface, and a dispatch interface (with possible enhanced dispatch services). Mobile device users often fetch or receive telephone numbers over a data channel, such as through a Web browser, a V-card, or a text message. Users often desire to initiate a telephone session by calling one of the received numbers. At present, initiating these calls is a multi-step process.

That is, a user determines a desired number and either remembers the number or writes it down. The user then exits an interface in which the number is presented and dials the retrieved phone number using a telephone interface. This process is subject, of course, to a user forgetting the desired number, to a user not being in a situation where it is convenient to write the number, and other such inconveniences which are very frustrating to a user.

An inability of current mobile device interfaces to more cohesively handle telephone numbers between the varying interfaces is based somewhat on underlying hardware and infrastructure restrictions. More specifically, mobile devices with data and voice capabilities are dual modem devices that are able to utilize more than one transmission channel or mode, such as a data channel, a dispatch channel, and/or a voice channel. These devices are often referred to as dual mode or multi mode devices which for simplicity are referred to generically hereafter as dual mode devices. Dual mode devices can face a scenario in which one communication channel is active and a different channel wants to come into service. Even short periods of simultaneous dual transmissions can be disallowed for some dual mode device implementations.

For example, Federal Communication Commission (FCC) guidelines, such as Specific Absorption Rate (SAR) requirements, can be violated when a mobile device transmits over more than one channel at a time. Antenna diversity, software/firmware infrastructure, service agreements, and other considerations can also limit a mobile device to a single active communication channel at a time.

Dual mode devices typically have an underlying infrastructure that maintains a strict separation between applications providing telephony functions and applications providing data communication functions. Further, telephony functions are often implemented at an extremely low level of the mobile device which, for security reasons, is protected. Data communication applications are often applications written for a JAVA virtual machine which does not have access to the lower level telephony functions. Similarly, native applications and other device applications can be shielded from lower level telephony functions. For all of these reasons information is not typically able to be conveyed across boundaries separating data applications from telephony applications. No known mobile device is able to convey telephone numbers or other contact information across this interface boundary.

SUMMARY OF THE INVENTION

The present invention discloses a communication device augmentation that permits contact content contained within an application, such as a Web browser, to be automatically identified, selected, and stored without exiting the application containing the contact content. The selected contact information can also be selectively used by a different application or software program. In one embodiment, this software program can initiate a communication between the communication device and a device associated with the contact information. When the initiated communication is conducted over a different communication channel, the original communication channel and active applications associated with it can be automatically terminated, disabled, or suspended.

The present invention includes numerous interface enhancements and intuitive user controls. In one embodiment, visual indicators (e.g., icons, highlighting, etc.) can be presented next to detected contact content. Navigation controls can permit a user to select among a set of visually identified contact elements. Pop-up windows and other such prompts can permit a user to select a desired contact action for a contact item. For example, a user can be prompted via a pop-up menu to choose whether to dial a phone number, which is one type of contact item, whether to add the phone number to a phone book, or whether to perform some other contact action involving the phone number. In another embodiment, a user can select a connect button (e.g., dial button on a mobile phone) to identify phone numbers contained within Web content and can make a second selection of the connect button to dial one of the identified numbers that has current focus. Interface controls and elements can vary based upon capabilities of a computing device, which implements aspects of the disclosed invention.

The present invention can be implemented in accordance with numerous aspects consistent with material presented herein. For example, one aspect of the present invention can include a method for handling contact information in a mobile device. The method can include a step of presenting content within a visual interface of a mobile computing device. A contact detection algorithm can execute to detect contact items included in the content. A visual indication can be presented next to each detected contact item. User input can be received, which causes the mobile device to establish a communication relating to one of the contact items. The contact action can add contact information to an address book, can initiate a communication session, and/or can place the contact item in a memory space for later use by a communication application.

Another aspect of the present invention can include a contact engine software package that is stored in a machine readable media of a computing device. The contact engine can include a contact discovery component, a contact selection component, an action selection component, and/or an action implementation component. The contact discovery component can detect contact content appearing within a graphical user interface of an active application. The contact discovery component can also cause a visual indicator to appear within the graphical user interface to distinguish the detected contact content from other content. The contact selection component can allow a user to select a contact item of detected contact content. The action selection component can visually present within the graphical user interface a set of user selectable options for the contact action to be performed against the selected contact item. The action implementation component can permit a computing device to initiate a contact action for the selected contact item. The contact action can be an action that adds contact information to an address book, that initiates a communication session, and/or that places the contact item in a memory space for later use by another application.

Yet another aspect of the present invention can include a dual-mode mobile computing device that includes more than one modem, a modem controller, a contact engine, and a set of user controls. One of the modems can handle real-time voice communications and another can handle data communications. The modem controller can prevent concurrent activation of multiple modems. That is, a data modem and a voice communication modem cannot be concurrently active. The contact engine can detect contact content presented in an application when a data communications modem is activated. The set of user controls can permit a user to select detected contact content that includes a phone number and to directly dial the included number to establish a real-time voice communication. The real-time voice communication can require the voice communication modem to be active.

It should be noted that various aspects of the invention can be implemented as a program for controlling computing equipment to implement the functions described herein, or as a program for enabling computing equipment to perform processes corresponding to the steps disclosed herein. This program may be provided by storing the program in a magnetic disk, an optical disk, a semiconductor memory, any other recording medium, or can also be provided as a digitally encoded signal conveyed via a carrier wave. The described program can be a single program or can be implemented as multiple subprograms, each of which interact within a single computing device or interact in a distributed fashion across a network space.

The method detailed herein can also be a method performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
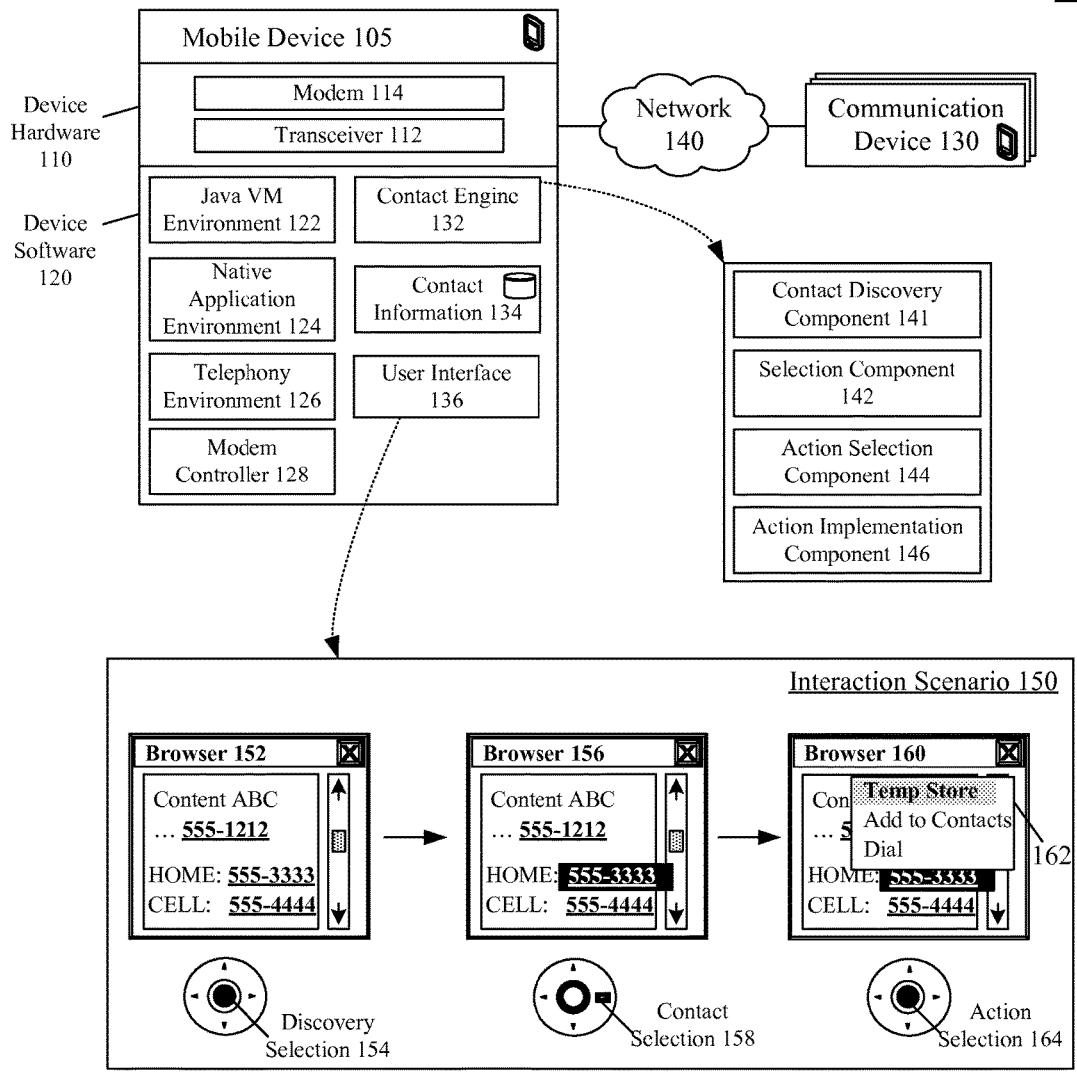
FIG. 1 is a schematic diagram of a communication device having a user interface that permits a user to utilize contact information to initialize a communication session where the application containing the contact information lacks an intrinsic capability to utilize the contact information.

FIG. 1 is a schematic diagram of a mobile device 105 having a user interface 136 permitting a user to utilize contact information to initialize a communication session, where the application containing the contact information lacks an intrinsic capability to utilize the contact information. The user interface 136 can detect contact specific content, such as phone numbers, and provide a visual indicator next to the content which indicates the contact information has been detected. A user can use available selection mechanisms to cycle through a set of different detected contact items and to select a desired one. Upon selection, one or more options can be selected that can be performed using the selected item. For example, a user can select a detected phone number from within a browser and select an option to either call the number or add the number to a phone book of the mobile device 105. The mobile device 105 can communicate with other communication devices 130 over network 140.

The mobile communication device 105 can include hardware 110 that enables the device 105 to communicate over more than one communication channel. For example, the hardware 110 can permit the device 105 to communicate using a voice or interconnect channel, a dispatch channel, and/or a data channel. The hardware 110 can be capable of simultaneous transmissions over more than one of the communication channels, which could be a disfavored hardware capability for numerous reasons. For example, simultaneous transmissions could result in the device 105 violating Specific Absorption Rate (SAR) requirements and/or violating a contractual agreement between a device 110 manufacturer and a service provider. In another example, the software/firmware infrastructure of the device 110 can be designed to handle a single active communication session at a time, and concurrent sessions can result in unpredictable behavior. The device software/firmware 120 can be designed to prevent the device 105 from concurrently transmitting over more than one communication channel. A modem controller 128 can manage which of multiple modems 114 or modem states are active and can impose restrictions that cause only one modem 114 to be active at any one time.

The device hardware 110 can include one or more transceivers 112 and at least one modem 114. The transceiver 112 can be a wireless transceiver that permits digital content to be exchanged between device 105 and device 130. That is, the transceiver 112 can be a component that connects device 105 to network 140. Different transceivers 112 can be included for communication over different channels. For example, one transceiver 112 can be a wide area network (WAN) transceiver for mobile telephony and data communications and another can be a personal area network (PAN) transceiver for BLUETOOTH, WIFI, and other PAN communications. One or more modems 114 can be used to physically support communication services, such as data, dispatch, and telephony services.

Network 140 can include any hardware/software/and firmware necessary to convey digital content encoded within carrier waves. Content can be contained within analog or digital signals and conveyed through data or voice channels and can be conveyed over a personal area network (PAN) or a wide area network (WAN). The network 140 can include local components and data pathways necessary for communications to be exchanged among computing device components and between integrated device components and peripheral devices. The network 140 can also include network equipment, such as routers, data lines, hubs, and intermediary servers which together form a packet-based network, such as the Internet or an intranet. The network 140 can further include circuit-based communication components and mobile communication components, such as telephony switches, modems, cellular communication towers, and the like. The network 140 can include line based and/or wireless communication pathways.

The device software 120 can include a JAVA Virtual Machine (VM) environment 122, a native application environment 124, and a telephony environment 126. The VM environment 122 can be an environment capable of executing any software application written to conform to specifications of a VM such as third party applications. The native application environment 124 can be a computing environment specific to the mobile device 105. Native applications executing in the native application environment 124 are typically those applications provided by the mobile device 105 manufacturer which are included upon the mobile device 105 at a time of purchase. Native applications often have access to low-level functions which are unavailable to the applications executing in the VM environment 122 for security reasons. The telephony environment 126 is an environment that handles telephone communications, dispatch communications, and the like.

The device software 120 can also include a contact engine 132 and a content information memory space 134. The memory space 134 can be a space used to store contact content presented in an application that executes in the VM environment 122 or the native application environment 124. Once stored in memory space 134, a different native application executing in environment 124 can access the contact content. Additionally, applications and software programs executing in the telephony environment 126 can access the contact content stored in memory space 134. Without memory space 134, mobile devices typically do not have a means for conveying information (e.g., contact content) across interface boundaries of the environments 122-126.

In one embodiment, security and transformation software routines can execute to ensure that information placed in memory space 134 is non-destructive and is properly formatted for the device. For example, if detected contact content includes a phone number with an area code, which is the same as an area code of the mobile device 105, the phone number stored in the memory space 134 can exclude the area code, which is not needed for dialing. Similarly, when a detected phone number lacks an area code, one may have to be automatically determined from other contact content, such as a postal address, before the phone number is added to the memory space 134. Security routines in device 105 can prompt a user before connecting to an un-trusted contact device referenced by contact information stored in memory space 134. Other security routines in device 105 can prevent certain types of contact information from being added to the memory space 134, such as preventing 1-900 phone numbers and/or preventing email addresses including a restricted word (e.g., sex, nude, etc.) from being included in memory space 134, which inhibits a possibility that a disfavored communication be established based on automatically detected contact content.

The contact engine 132 can be a software component that detects contact content, provides a selection mechanism for detected contact content, and allows users to trigger contact actions based upon the selected contact content. The contact engine 132 can include a contact discovery component 141, a selection component 142, an action selection component 144, and an action implementation component 146.

The contact discovery component 141 can automatically detect contact content appearing within a graphical user interface (GUI) of an active application. The contact discovery component 141 can use a series of configurable rules, such as searching for a sequence of digits, dashes, dots, and parentheses indicative of a phone number, searching for symbols such as the "@" symbol characteristic of email addresses, and searching for layouts characteristic of postal addresses, to detect contact content. The contact discovery component 141 can also apply transformation rules to convert content to a device-specific standard format as necessary. For example, component 141 can internally convert all phone numbers to be a set of numbers, where punctuation is excluded. Other rules of component 141 can group related contact content to one another, such as grouping a postal address, a phone number, and an email address together when the rules indicate that all this contact content applies to the same entity.

Additionally, the contact discovery component 141 can cause a visual indicator to appear within the graphical user interface to distinguish the detected contact content from other content. Any visual indicator can be used. For example, discovered contact items can be highlighted, can have a different text color, can have a different font size or type, can have a characteristic icon displayed, and the like. The contact discovery component 141 can also include a user-configurable option to enable/disable the visual indicator. It may be preferable to disable visual indicators in situations where the indicators are more distracting to a user than helpful. Further, an option and/or setting can be provided to show visual indicators for only the contact item which has focus.

The contact selection component 142 can allow a user to select a contact item of detected contact content. Multiple different controls, with redundant capabilities, can be used by component 142. For example, a user can select a contact item by touching the item, by selecting a device button, by manipulating a mouse or other pointing over the item and "clicking" the item, by issuing a voice command, and the like. Controls associated with component 142 can be overloaded controls, which have different behavior depending on a device 105 state at a time the control was selected. For example, a connect button of a mobile phone can be overloaded to cause a detected phone number having focus that is contained within presented Web content to dial that number when pressed. In a different device state, the connect button can behave differently, such as by dialing a number entered in a dialer interface. Controls associated with the component 142 can be user-configurable to behave in a user specified manner.

The action implementation component 144 can visually and/or audibly present a set of user selectable options for the contact action to be performed against the selected contact item. Component 144 can, for example, present a pop-up list of possible actions from which a user can select. The action implementation component 144 is not limited to pop-ups and can use selectable icons, buttons, voice commands, and the like, to receive user selections.

The action implementation component 146 can permit a mobile computing device 105 to initiate a selected contact action for the selected contact item. Initiating contact actions can cause a state of a previously active modem to change so that a different modem can be activated. Further, previously open applications may have to be disabled or temporarily closed to initiate a new application or program initiated via the contact action. For example, the contact action can initiate an action executing in the telephony environment 126 which may cause all programs executing in the VM environment 124 to close. State information for open applications can be saved before closing them so that component 146 can restore the device 105 to an original state once actions associated with the contact action have completed.

Interaction scenario 150 illustrates a sample use of the user interface 136 of system 100. In scenario 150, a browser 152 of device 105 can include content which contains a set of phone numbers. These phone numbers can be discovered by the contact engine 132. Discovery can be automatic when an associated automatic discovery setting is enabled and/or can be performed after an explicit user selection, such as discovery selection 154. A visual indicator can distinguish discovered content from other content, such as by bolding and underlying the discovered phone numbers as shown in browser 152.

A user can select among discovered phone numbers as shown in browser view 156. A contact selection control 158 can cycle through available ones of the phone numbers, as shown by highlighting a phone number currently having selection focus, which is phone number "555-3333" in browser view 156. A user can then be prompted 162 to select a contact action to be performed, as shown in browser view 160. For example, a user can be provided options to store a contact item (e.g., the selected phone number) in a temporary memory space (e.g. memory space 134), can add the contact item to a list of contacts, can convey the contact item to another communication device over a peer-to-peer (e.g., BLUETOOTH, IR, etc.) or other connection (e.g., WIFI), or can dial the selected phone number. Different options can be provided for different types of contact information. For example, when a selected contact item is an email address, an option to send email can replace the dial option of option prompt 162. A user can select an action using control 164 which causes the action to be performed.

Some user selectable contact actions may require a user to deactivate or terminate an active application that uses one modem (e.g., a Web browser) so that another modem (e.g., a modem for dialing a phone number) can be activated. In one embodiment, application state information can be stored so that once the contact action (e.g., a telephone session between device 105 and device 130 associated with the dialed phone number) ends, an original application can be automatically restored to its original state (e.g., the browser 152 can be activated which contains Web content as it existed before the contact action executed.)

Figure 2:
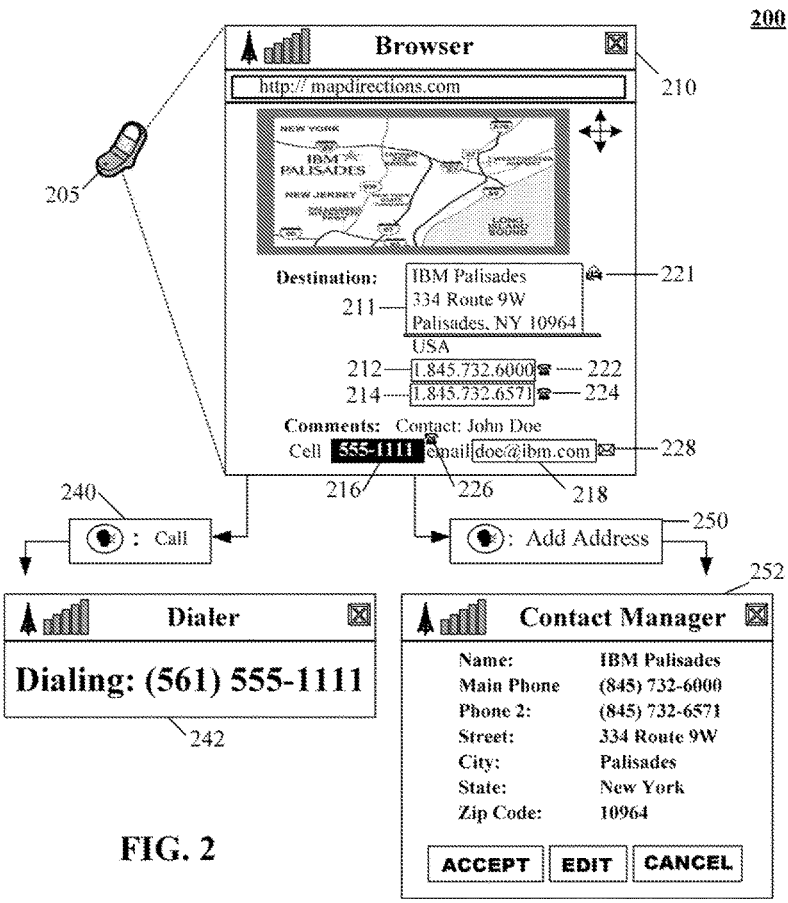
FIG. 2 illustrates a sample scenario of a computing device interface which identifies and uses contact information in accordance with an embodiment of the inventive arrangements disclosed herein.

FIG. 2 illustrates a sample scenario 200 of a communication device interface which identifies and uses contact information in accordance with an embodiment of the inventive arrangements disclosed herein. The communication device 205 of scenario 200 can be mobile device 105 or any other communication device.

A browser 210 of the communication device can render Web content. An algorithm executing on device 205 can automatically detect contact information 211-218 contained within the Web content. The contact information 211-218 can include phone numbers (e.g., items 212-216), postal addresses (e.g., item 211), email addresses (e.g., item 218), and other similar contact information. A visual indicator 221-228 can be presented next to each contact item 211-218. The visual indicator can, for example, include using a different font color, font background, font size, font style, border, and the like around identified contact information. Further, icons 221-228 or other graphic objects can be used as a visual indicator. Different visual indicators can be used to denote a type of content item 211-218. For example, a postal icon 221 can be presented near a postal address 211, a phone icon 222-226 can be presented near a phone number 212-216, and an email icon 228 can be presented near an email address 218.

Some contact actions can only be performed against a particular type of contact item 211-218. For example, a dial phone number action can require that a phone number 212-216 be provided. In another example, a send email action can require that an email address 218 be provided. Other contact actions, such as an action that adds contact information to an address book, can work with different types of contact items and can even concurrently utilize a set of related contact items. For instance, an add address information 250 action can result in related contact items 211-224 being added to a contact listing. That is, a contact manager 252 interface can be presented with automatically inserted fields taken from Web browser content, which a user can accept, edit, or discard as desired.

In one embodiment, when only one contact item 211-218 contained in browser 210 is relevant to a user command, that item 211-218 can be automatically used. For example, since only one email address 218 is identified in the Web content, a control to send email can automatically populate a recipient field with the email address 218 when the email control is selected at a time the browser 210 content is displayed. If a user command relates to multiple different items 211-218, a user may have to select which contact item 211-218 the action is to be performed against.

In one contemplated configuration, one of the detected contact items 216 can have a window focus property, which can be used to resolve ambiguities. For example, a contact action requiring a phone number as input can be triggered, which causes a phone number having with focus (e.g., phone number 216) to be utilized. As shown, a user issued call 240 command can cause device 205 to dial 242 a phone number specified by contact item 216. Additionally, a user selectable control can permit a user to change which contact item 211-218 has focus. For example, a user can touch a touch-sensitive screen near a desired contact item 211-218 to grant focus to an item 211-218 nearest the touch. In another example, the user could scroll through contact items 211-218 using a navigation button.

Figure 3:
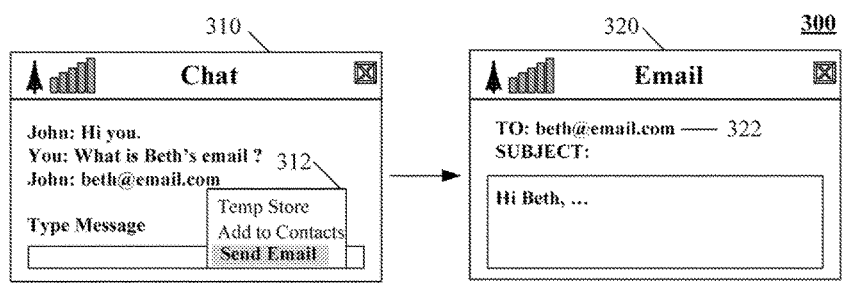
FIG. 3 illustrates another sample scenario of a computing device interface which identifies and uses contact information in accordance with an embodiment of the inventive arrangements disclosed herein.

It should be appreciated that different forms of commands can trigger contact actions. For example, a user can issue a voice comment 240 or 250, which triggers a related contact action. A user can also select a GUI displayed control and/or a device-specific button to trigger an associated contact action FIG. 3 illustrates another sample scenario 300 of a communication device interface, which identifies and uses contact information in accordance with an embodiment of the inventive arrangements disclosed herein. The communication device that presents interfaces 310 and 320 can be mobile device 105 or any other computing device. Scenario 300 illustrates that automatically identified contact content can be presented in a variety of applications and can be used to initialize a variety of communication types. For example, the contact content can be presented within a word processing application, an email message, a chat dialog (e.g., interface 310), a text message, a dispatch message, and the like. Further, the communication initiated from the detected contact content can include a phone communication, a text message communication, a chat communication, an email communication (e.g., interface 320), a dispatch communication, and the like.

As shown in scenario 300, a chat interface 310 can present a dialog between a user and a person identified as John. John can convey an email address (e.g., beth@email.com), which can be automatically identified as contact content. A set of options 312 for contact actions can then be provided which relate to the conveyed email address. When a user selects an option 312 to send an email message, interface 320 can automatically be presented, which automatically includes the conveyed email address in a recipient section 322 of email interface 320.

It should be appreciated that the interfaces illustrated in FIGS. 1-3 are for illustrative purposes only and that the invention is not to be construed as limited in this regard. Alternative interface control mechanisms, interface modalities, and arrangements are contemplated. For example, the option popup window 312 could be implemented as a set of hot-keys and/or selectable icons in a different embodiment. In another example, controls 154, 158, and 164 of system 100 can be implemented as touch-screen controls or voice-response controls. Specific implementation details can depend upon device capabilities, a set of user configurable interface preferences, and interface designer choices.

Figure 4:
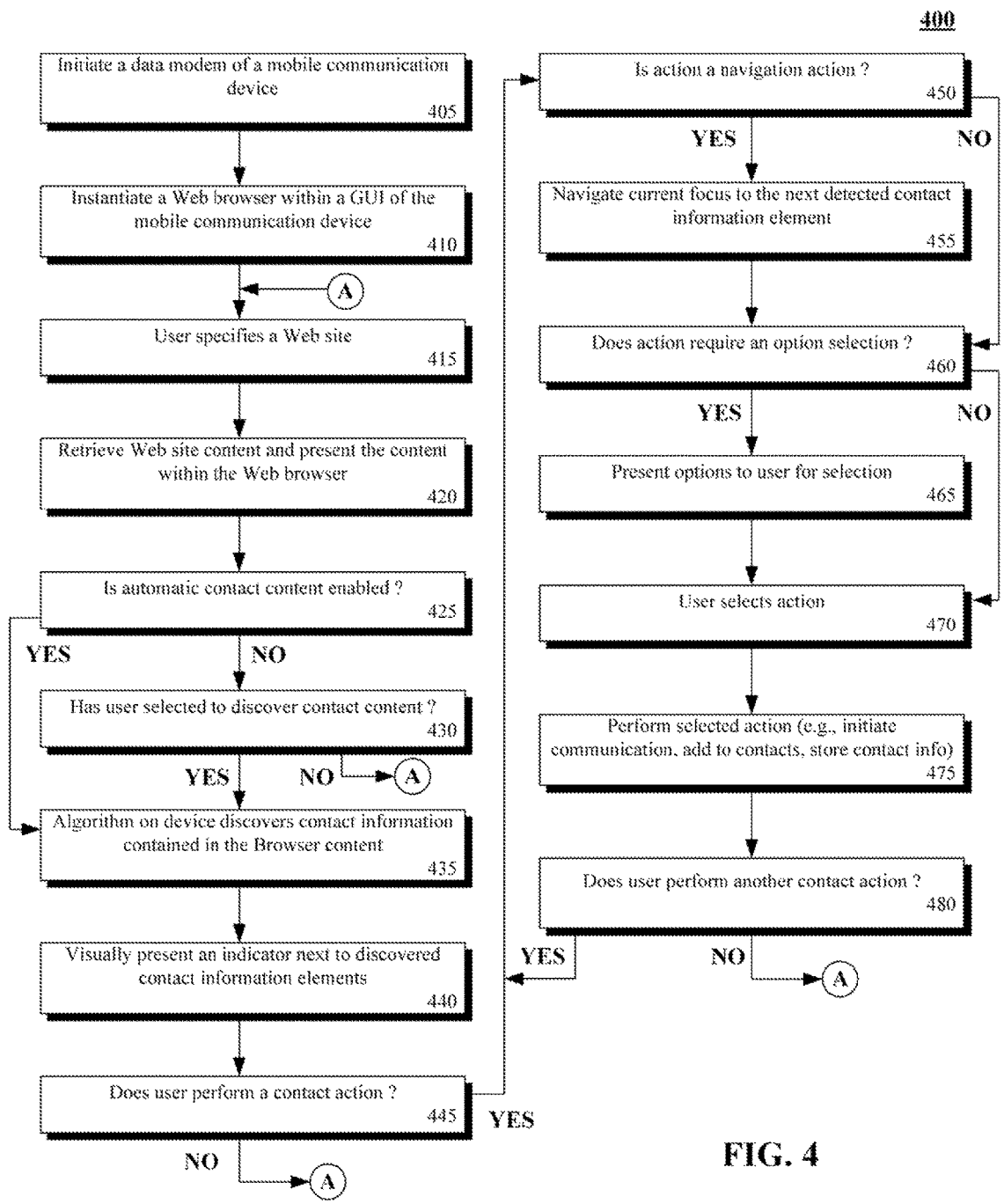
FIG. 4 is a flow chart of a method for interacting with phone numbers and other contact information contained within application content in accordance with an embodiment of the inventive arrangements disclosed herein.

FIG. 4 is a flow chart of a method 400 for interacting with phone numbers and other contact information contained within application content in accordance with an embodiment of the inventive arrangements disclosed herein. The method 400 can be performed in the context of a system 100 or any of a variety of communication devices. Although details of method 400 are expressed for Web browser content, the contact content can be contained in any application, such as an email application, a word processing application, a chat application, and the like.

Method 400 can begin in step 405, where a data modem of a communication device is initiated. In step 410, a Web browser can be instantiated within a GUI of the mobile communication device. The data modem can convey information that is provided to the Web browser. In step 415, a user can specify a Web site within the Web browser. In step 420, Web site content can be retrieved and can be presented within the Web browser. In step 425, device settings can be checked to determine whether automatic contact content features have been enabled. One of these features can be a feature that automatically identifies contact content presented in the Web site. When such as feature is enabled, the method can skip to step 435, where the device can discover content information contained in the browser content. Otherwise, the method can progress from step 425 to step 430, where a check for a manual user selection relating to discovering contact information can be conducted. When a user chooses to have contact content discovered, the method can progress to step 435, where discovery can occur. Otherwise, the method can loop from step 430, where a user can interact with the device. One of the interactions can be to specify a different Web site, as shown in step 415, which causes new content for the site to be presented in the browser.

After contact information is discovered in step 435, an indicator can be visually presented next to discovered contact information elements, as shown in step 440. For example, each contact information element can be highlighted, can be presented in a different font or font color, can be indicated by a displayed icon, and the like. In step 445, a check can be performed as to whether a contact action is to be performed based upon user selections. If no action is to be performed, the method can loop to step 415, where a user can specify another Web site. If a contact action is detected, the method can progress to step 450, where a type of contact action can be determined. For example, the contact action can be a navigation action, which causes a focus to jump from one contact information element to a next element, as shown in step 455. The contact action can require an additional user selection, as shown by step 460. For example, a user may have to select whether a contact information element, such as a phone number, is to be dialed, is to be added to a contact list, is to be conveyed to a remote computing device, or is to be added to a temporary memory space like a contact information clipboard. A set of selectable options can be presented in step 465. A user can select one of these options in step 470. Further, the original contact action of step 445 can be directly specified and not need any further user decisions, which results in the method directly progressing from step 460 to 470. In one embodiment, for example, a phone number presented in the Web browser that has been visually identified can be dialed, whenever a user presses a dial button on a mobile phone.

Once the contact action has been selected, the computing device can perform the action in step 475. When performing the action requires use of a voice modem, the data modem can be disabled before the voice modem is enabled, which may require the Web browser to be closed or suspended. After an operation that requires the voice modem is completed, the mobile device can be restored to its original state. That is, the suspended or terminated Web browser can resume and/or can be re-instantiated. In step 480, a check for another contact action can be performed. When another contact action is selected, the method can loop from step 480 to step 450, where the contact action can be handled. When no further contact action is to be performed in step 480, the method can loop to step 415, where a user can specify another Web site or can otherwise use the computing device.

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A computer-implemented method, comprising: providing a dual mode device that includes: a memory configured to store data, a telephone communications module structured and programmed to provide telephone communications capability and telephone calling capability through lower level telephony functions, and an email and/or chat application (ECA) programmed for a JAVA virtual machine to provide email and/or chat communications capability, and an interface boundary between the ECA and the lower level telephony functions; installing, on the dual mode device, a contact engine including a security-and-transformation module having security and transformation software routines and a memory-space-creation module; executing the security and transformation software routines to determine that creation of a memory space would be non-destructive with respect to the dual mode device; creating, by the memory-space-creation module and in the memory of the dual mode device, a memory space for storing contact information in a manner so that the interface boundary does not prevent the contact information stored in the memory space from being accessible to lower level telephony functions responsive to a determination that creation of the memory space would be non-destructive with respect to the dual mode device; storing, by the ECA, a first contact information set including information indicative of a first telephone number; retrieving, by the lower level telephony functions of the telephone communications module, the first telephone number; and placing, by the lower level telephony functions of the telephone communications module, a first telephone call to the first telephone number, wherein the security and transformation software routines, prior to the placing the first telephone call, are configured to determine whether the first telephone number is to a trusted device.

2. The method of claim 1, wherein
the security and transformation software routines, prior to the storing the first contact information set, compares the first contact information set to information indicative that the first contact information set is associated with a disfavored communication.

3. The method of claim 1, wherein
the security-and-transformation module configures the first contact information set in a manner consistent with the dual mode device.

4. A dual mode device, comprising: a memory configured to store data, a telephone communications module structured and programmed to provide telephone communications capability and telephone calling capability through lower level telephony functions, and an email and/or chat application (ECA) programmed for a JAVA virtual machine to provide email and/or chat communications capability, and an interface boundary between the ECA and the lower level telephony functions; a contact engine including a security-and-transformation module having security and transformation software routines and a memory-space-creation module; and a hardware processor configured to initiate the following operations: executing the security and transformation software routines to determine that creation of a memory space would be non-destructive with respect to the dual mode device; creating, by the memory-space-creation module and in the memory of the dual mode device, a memory space for storing contact information in a manner so that the interface boundary does not prevent the contact information stored in the memory space from being accessible to lower level telephony functions responsive to a determination that creation of the memory space would be non-destructive with respect to the dual mode device; storing, by the ECA, a first contact information set including information indicative of a first telephone number; retrieving, by the lower level telephony functions of the telephone communications module, the first telephone number; and placing, by the lower level telephony functions of the telephone communications module, a first telephone call to the first telephone number,
wherein the security and transformation software routines, prior to the placing the first telephone call, are configured to determine whether the first telephone number is to a trusted device.

5. The system of claim 4, wherein the security and transformation software routines, prior to the storing the first contact information set, compares the first contact information set to information indicative that the first contact information set is associated with a disfavored communication.

6. The system of claim 4, wherein the security-and-transformation module configures the first contact information set in a manner consistent with the dual mode device.

* * * * *